H. J. WIEGAND.
HELICAL SPRING BELT.
APPLICATION FILED JULY 19, 1919.

1,378,507.

Patented May 17, 1921.

INVENTOR.
Henry J. Wiegand
BY
ATTORNEY

UNITED STATES PATENT OFFICE.

HENRY J. WIEGAND, OF MILWAUKEE, WISCONSIN, ASSIGNOR TO THE CUTLER-HAMMER MFG. CO., OF MILWAUKEE, WISCONSIN, A CORPORATION OF WISCONSIN.

HELICAL-SPRING BELT.

1,378,507.

Specification of Letters Patent.

Patented May 17, 1921.

Application filed July 19, 1919. Serial No. 312,031.

*To all whom it may concern:*

Be it known that I, HENRY J. WIEGAND, a citizen of the United States, residing at Milwaukee, in the county of Milwaukee and State of Wisconsin, have invented new and useful Improvements in Helical-Spring Belts, of which the following is a full, clear, concise, and exact description, reference being had to the accompanying drawing, forming part of this specification.

This invention relates to helical spring belts and more particularly to means for connecting the ends of the springs constituting such belts.

Belts of this character are very advantageous for newspaper conveyers and other mechanisms, but due to the lack of suitable end connections therefor, the same have heretofore proven troublesome in use. In newspaper conveyers, for example, the belts are passed over sheaves of relatively small diameter and the connections have been subjected to breakage due to the strains and wear thereon in passing over such sheaves.

The present invention has among its objects to provide such belts with simple and durable means to connect the ends thereof, said means being particularly adapted for belts used in the aforesaid relation.

Another object is to provide such belts with connecting means which obviate the necessity for bending the spring ends and which may be concealed within the spring helices.

Various other objects and advantages of the invention will hereinafter appear.

Referring to the accompanying drawing.

Figure 1:
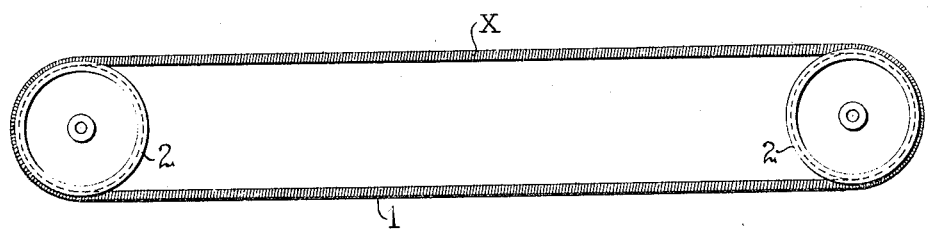
Figure 1 is a view of a belt connected in accordance with the invention.
Figure 2:
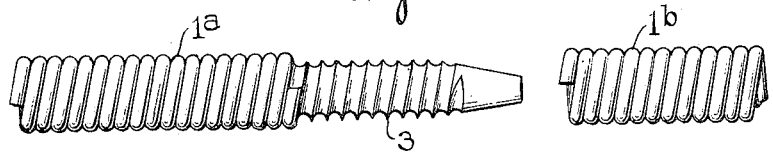
Fig. 2 is an enlarged view of the belt portions to be connected and the connecting member therefor; and, Fig. 3 is an enlarged view of said connecting member.

The belt illustrated comprises a single helical spring 1 having its extremities connected at $x$, said extremities being shown enlarged in Fig. 2 and designated as $1^a$ and $1^b$. The spring thus forms an endless belt which, for purposes of illustration, is mounted on sheave 2. The belt might, of course, be formed of a plurality of springs connected to one another by means identical with that employed for the belt shown.

Figure 3:
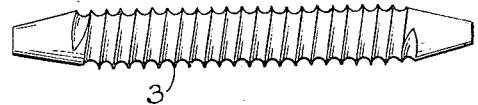

The connecting means for the extremities of spring 1 comprises a threaded member 3 (Fig. 3) having its opposite ends screwed into said spring extremities. The member 3 may be formed of any suitable material although it is preferably formed of rawhide which is strong and durable and also flexible. Moreover, rawhide is advantageous in that it is compressible and affords an exceedingly good gripping surface for the spring helices which tighten thereon as the spring is stretched axially. Also, where the spring is subjected to a lubricant rawhide is advantageous for as it becomes soaked with the lubricant it tends to swell, thus increasing the grip between the same and the spring.

While the member 3 is shown as threaded it is to be understood that a similar member with a smooth or otherwise roughened surface may be used if preferred. Also, it is to be understood that the member 3 may be of any preferred length.

In practice it is preferred to insert the member 3 equal distances into the spring ends to be connected and to connect the spring ends in close proximity for concealment of said member to protect the latter against wear.

What I claim as new and desire to secure by Letters Patent is:

1. The combination with a helical spring belt, of a rawhide connecting member having its opposite ends inserted axially into adjacent portions of said belt to be gripped by the helical thereof.

2. The combination with a helical spring belt, of a threaded rawhide member having its opposite ends threaded into adjacent portions of said belt to secure the same together.

In witness whereof, I have hereunto subscribed my name.

HENRY J. WIEGAND.